(12) United States Patent
Chai et al.

(10) Patent No.: US 8,010,254 B2
(45) Date of Patent: Aug. 30, 2011

(54) VEHICLE STEERING CONTROLLER

(75) Inventors: Yu Wun Chai, Isehara (JP); Takaaki Eguchi, Yokohama (JP); Taku Suzuki, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 946 days.

(21) Appl. No.: 11/944,740

(22) Filed: Nov. 26, 2007

(65) Prior Publication Data

US 2008/0162001 A1 Jul. 3, 2008

(30) Foreign Application Priority Data

Dec. 28, 2006 (JP) .................................. 2006-353901

(51) Int. Cl.
*G06F 19/00* (2006.01)
(52) U.S. Cl. .......................................... 701/42; 701/72
(58) Field of Classification Search .................... 701/36, 701/41, 42, 44, 70, 72, 91; 180/443, 444, 180/446, 445, 197
See application file for complete search history.

(56) References Cited

U.S. PATENT DOCUMENTS

| 6,931,313 B2 * | 8/2005 | Kato et al. ...................... 701/41 |
| 2005/0071061 A1 * | 3/2005 | Kato et al. ...................... 701/41 |

FOREIGN PATENT DOCUMENTS

| EP | 1 407 950 A1 | 4/2004 |
| EP | 1 415 893 A2 | 5/2004 |
| JP | 2000-108914 A | 4/2000 |
| JP | 2003-137124 A | 5/2003 |
| JP | 2004-155283 A | 6/2004 |

* cited by examiner

*Primary Examiner* — Richard M. Camby
(74) *Attorney, Agent, or Firm* — Young Basile

(57) ABSTRACT

A vehicle steering controller produces a steering system friction value and a tire lateral force value. A steering reactive force having a magnitude based on the tire lateral force value and the steering system friction value is generated for application to a steering wheel of the vehicle. By reflecting both the tire lateral force and the steering system friction in the steering reactive force, a good steering sensation can be realized in a steer-by-wire system.

18 Claims, 7 Drawing Sheets

US 8,010,254 B2

VEHICLE STEERING CONTROLLER

CROSS-REFERENCE TO RELATED APPLICATIONS

This application claims priority from Japanese Patent Application Serial No. 2006-353901, filed Dec. 28, 2006, which is incorporated herein in its entirety by reference.

TECHNICAL FIELD

The invention pertains to the field of vehicle steering controllers, and more particularly, the invention pertains to a vehicle steering controller that applies a reactive force to a steering wheel.

BACKGROUND

Steer-by-wire steering systems are known. Generally stated, in steer-by-wire steering systems, the steering wheel is not mechanically connected to the steered wheels of the vehicle. Instead, operation of the steering wheel sends an electrical signal to a turning mechanism that turns the steered wheels using a motor that is connected to the pinion gear of the turning mechanism. Furthermore, steer-by-wire steering systems that apply a reactive force to the steering wheel are known. For example, in Japanese Kokai Patent Publication No. 2000-108914, a reactive force corresponding to the lateral force acting on the tires of the vehicle is applied to the steering wheel by a reactive force motor that is connected to the steering wheel.

BRIEF SUMMARY

Embodiments of vehicle steering controllers and methods for a vehicle are taught herein wherein the vehicle includes a steering wheel to be manipulated by a driver and a turning mechanism mechanically separated from the steering wheel and operable to perform steering driving of at least one steered wheel corresponding to a steering angle of the steering wheel. According to one example of a vehicle steering controller taught herein, the controller comprises a tire lateral force detecting part configured to detect a tire lateral force acting on the at least one steered wheel and to output a tire lateral force value corresponding thereto, a friction-estimating part configured to estimate a steering system friction value and a steering reactive force generating part configured to generate a steering reactive force for application to the steering wheel, the steering reactive force having a magnitude based on the tire lateral force value and the steering system friction value.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In previous steer-by-wire systems, when an axial force sensor is provided for detecting the rack axial force and the steering reactive force is computed only from the sensor output value, only the tire lateral force is reflected in the steering reactive force. Drivers sometimes have awkward sensations that are not felt in conventional steering systems. The inventors have determined that the steering reactive force is not equivalent to the steering reactive force that would be felt by a driver using a conventional steering system because the friction present in steering system is omitted from the steering reactive force. Accordingly, exemplary embodiments of the invention described herein in detail with reference to the drawings provide a vehicle steering controller wherein both the tire lateral force and the steering system friction are reflected in the steering reactive force. In this manner, a good steering sensation can be realized.

Figure 1:
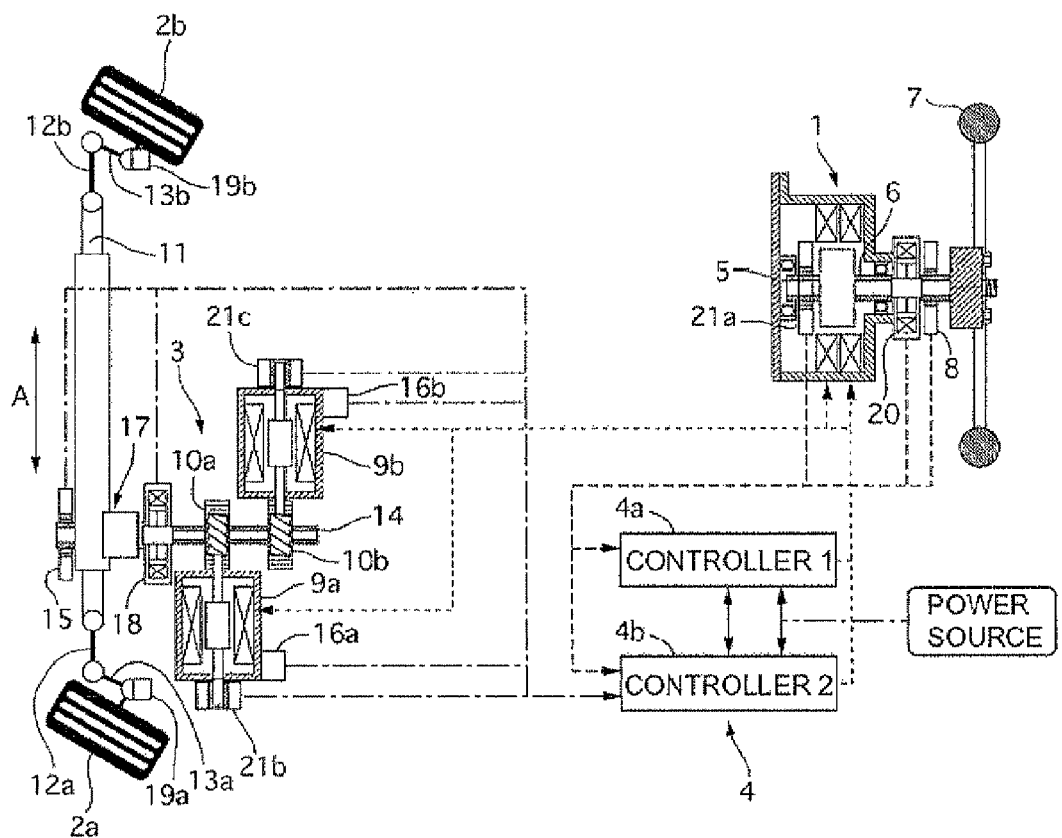
FIG. 1 is an illustration showing the components of a steer-by-wire system in which embodiments of the invention can be incorporated.

As shown in FIG. 1, embodiments of the invention can be incorporated in a steer-by-wire system that includes a steering mechanism 1 and a turning mechanism 3 for turning tires (steered wheels) 2a, 2b. Steering mechanism 1 and turning mechanism 3 are not mechanically connected to one another. The system also include controllers 4a, 4b (collectively, controller 4) for electrically connecting the steering mechanism 1 to the turning mechanism 3 and controlling the operation of both.

Steering mechanism 1 has a steering reactive force motor 5 that generates a steering reactive force. An encoder 21a is operatively connected to the steering reactive force motor 5 to determine the rotation angle thereof, and the output shaft of the steering reactive force motor 5 is connected to a steering wheel shaft 6. Also, steering mechanism 1 has a steering angle sensor 8 (steering angle detecting part) that detects the operating angle (steering angle) of a steering wheel 7 that can be manipulated by the driver and has a steering torque sensor 20 that detects the steering torque input to steering wheel shaft 6 by the driver.

In order to turn the tires 2a, 2b, turning mechanism 3 has a pair of turning motors 9a, 9b. The pair of turning motors 9a, 9b is provided with a pair of encoders 21b, 21c, wherein each encoder 21b, 21c is operable to determine the rotation angle of a respective one of the turning motors 9a, 9b. The turning motors 9a, 9b are connected to a pinion shaft 14 by a pair of gear mechanisms 10a, 10b so that the turning motors 9a, 9b may rotate the pinion shaft 14 and a pinion 17 connected to the pinion shaft 14. Turning mechanism 3 further includes a rack shaft 11 mechanically connected to pinion 17. In particular, the rack shaft 11 has a plurality of teeth (not shown) disposed thereon that are engageable with the pinion 17 such that rotation of the pinion 17 is operable to displace the rack shaft 11 along the direction of an axis A. In order to connect the rack shaft 11 to the tires 2a, 2b, the turning mechanism 3 includes a pair of tie rods 12a, 12b and a pair of knuckle arms 13a, 13b. Each of the tie rods 12a, 12b is connected to a respective end of the rack shaft 11, and each of the knuckle arms 13a, 13b connects one of the tie rods 12, 12b to a respective one of the tires 2a, 2b. In this manner, displacement of the rack shaft 11 is operable to turn the tires 2a, 2b.

In order to detect the rotation angle of pinion shaft 14, turning mechanism 3 includes a turning angle sensor 15. Due to the mechanical connection of the pinion shaft 14, the rack shaft 11 and the tires 2a, 2b, the rotation angle of the pinion shaft 14 is directly related to the displacement distance of the rack shaft 11 and the turning angle of the tires 2a, 2b.

Turning mechanism 3 also includes a plurality of sensors that provide input to the controller 4a, 4b regarding the operation of and forces exerted on the turning mechanism 3. Each of the turning motors 9a, 9b is provided with a motor current sensor 16a, 16b that detects the load currents of turning motors 9a, 9b. In order to measure the turning reactive force acting on pinion shaft 14, a turning torque sensor 18 (turning reactive force detecting part) is operatively connected to the pinion shaft 14. Direct measurement of the tire lateral force (road surface reactive force) experienced by the tires 2a, 2b is accomplished using axial force sensors 19a, 19b (tire lateral force detecting parts) that are operatively connected to the tires 2a, 2b. In particular, the axial force sensors 19a, 19b may be tire load sensors arranged in the tire hub portions, but are shown adjacent to the tires 2a, 2b in FIG. 1 to allow clear illustration thereof.

Controller 4 sets a target yaw rate based on the steering angle and the vehicle speed, computes the target turning angles of tires 2a, 2b, and controls actuation of turning motors 9a, 9b to turn tires 2a, 2b such that the actual turning angle of tires 2a, 2b is in agreement with the target turning angle.

In the steer-by-wire system, since steering mechanism 1 and turning mechanism 3 are not mechanically connected to one another, the road surface reactive force acting on the tires 2a, 2b and the reactive force acting on the vehicle suspension and rack shaft 11 and pinion 17 are not directly transferred to steering mechanism 1. In a conventional steering device, mechanical connection of the steering wheel shaft and the pinion shaft allows the driver to directly sense these forces through the steering wheel. As this is not possible in a steer-by-wire system, it is necessary to apply a steering reactive force on steering wheel 7 by means of steering reactive force motor 5 in order to realize the same steering sensation as experienced in a conventional steering device.

Figure 2:
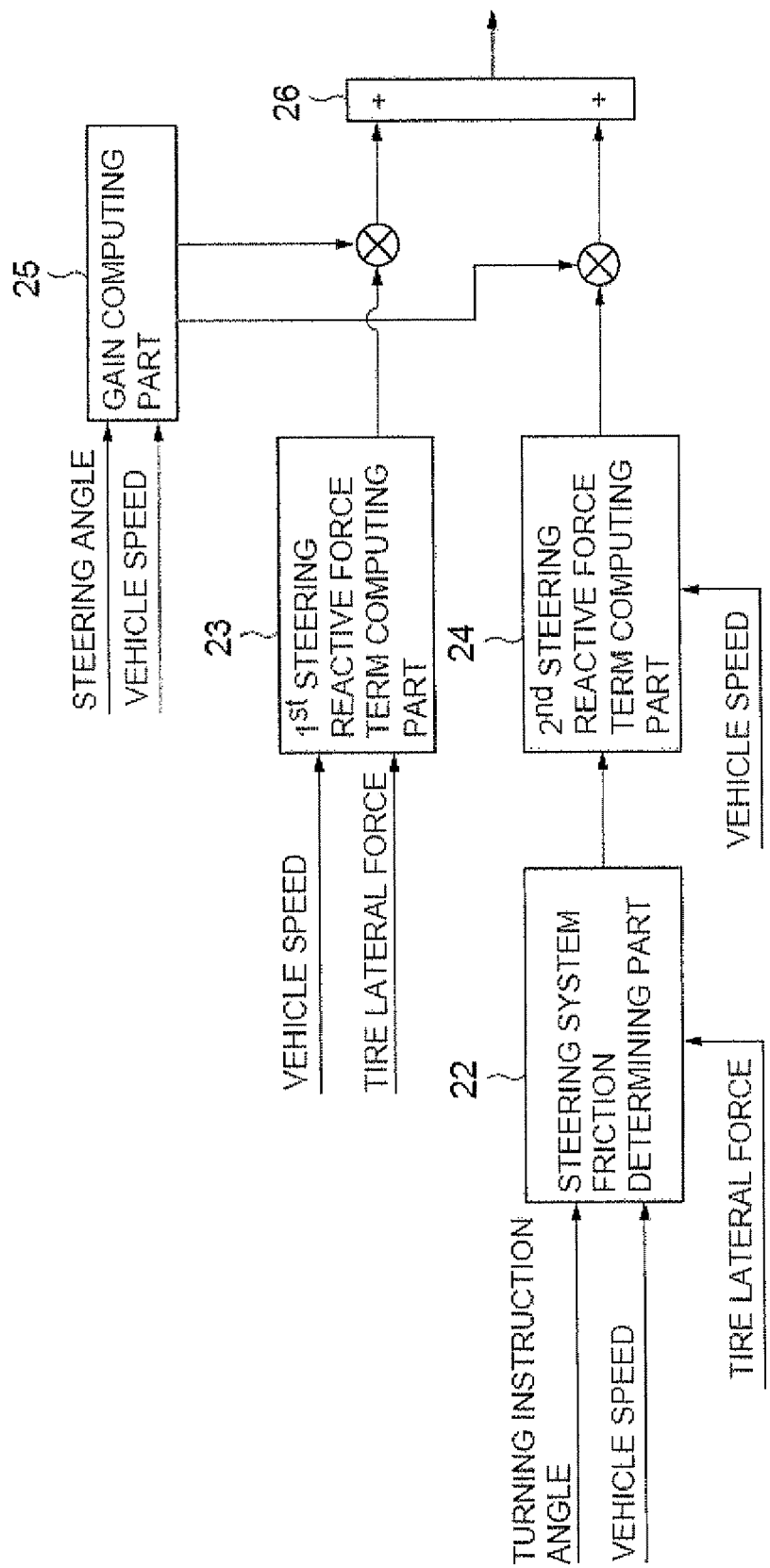
FIG. 2 is a block diagram showing computation of a steering reactive force by a controller according to FIG. 1.

FIG. 2 is a block drawing illustrating computation of a steering reactive force by controller 4. Controller 4 has a steering system friction-estimating part 22 (friction-estimating part), a first steering reactive force term computing part 23, a second steering reactive force term computing part 24, a gain computing part 25 and an adder 26. Controller 4 is here implemented by two controllers 4a, 4b, wherein each is, for example, a microcomputer including a random access memory (RAM), a read-only memory (ROM) and a central processing unit (CPU) in addition to various input and output connections. Generally, the control functions described herein and associated with each of the parts are performed by execution by the CPU of one or more software programs stored in ROM. Of course, some or all of the parts and their associated functions can be implemented by hardware components. While two controllers 4a, 4b are shown, only one or more than two are also possible Based on the target turning angle (also called "turning instruction angle" in the following description), the vehicle speed, and the tire lateral force input from tires 2a, 2b, steering system friction-estimating part 22 estimates the friction (resistance force) of the overall steering system including the vehicle suspension, the rack shaft 11 and the pinion 17.

Here, the vehicle speed refers to the vehicle speed detected with a vehicle speed sensor (not shown) usually set in the vehicle, and the tire lateral force refers to the sum of the values detected by axial force sensors 19a, 19b.

Figure 4:
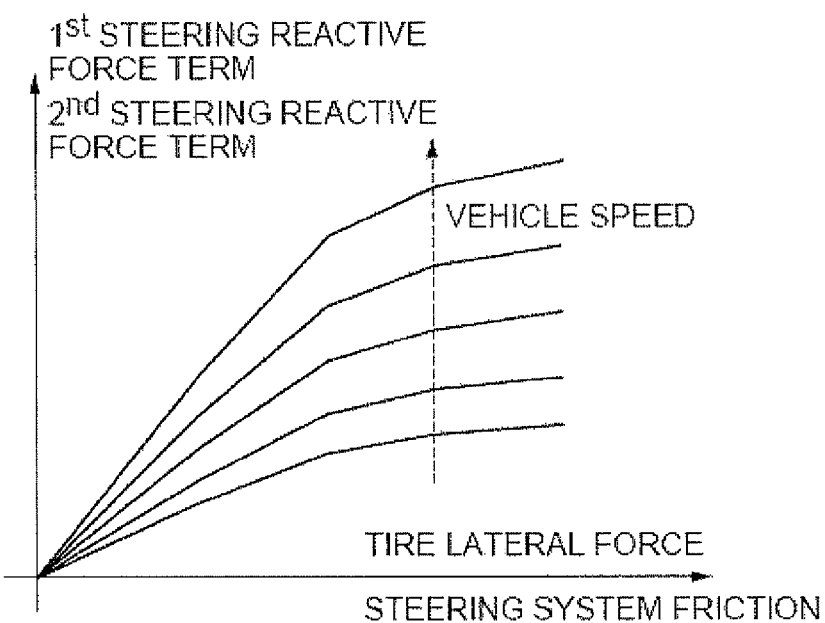
FIG. 4 is a diagram showing the relationship of first and second steering reactive force terms with tire lateral force and steering system friction.

First steering reactive force term computing part 23 computes a first steering reactive force term corresponding to the vehicle speed and the tire lateral force input from tires 2a, 2b. Here, the first steering reactive force term is set such that its value increases as the tire lateral force increases or the vehicle speed increases as seen in FIG. 4.

Second steering reactive force term computing part 24 computes a second steering reactive force term corresponding to the estimated value of the steering system friction and the vehicle speed. Here, the second steering reactive force term is set such that its value increases as the steering system friction increases or the vehicle speed increases as seen in FIG. 4.

Gain computing part 25 computes gain coefficients corresponding to the steering angle and the vehicle speed. The first steering reactive force term and the second steering reactive force term are respectively multiplied by the computed gain coefficients. More specifically, in gain computing part 25, for example, when the vehicle speed rises, the gain by which the first steering reactive force term is multiplied is decreased, while the gain by which the second steering reactive force term is multiplied is increased. Furthermore, when the steering angle increases, the gain by which the first steering reactive force term is multiplied is decreased, while the gain by which the second steering reactive force term is multiplied is increased. As a result, the higher the vehicle speed, or the greater the steering angle, the proportion of the second steering reactive force term in the steering reactive force is increased, while the proportion of the first steering reactive force term is decreased. Also, the relationship between the vehicle speed, steering angle and the gain is pre-stored, such as by a map, in gain computing part 25, which thus computes the gain based on the vehicle speed and the steering angle by using the pre-stored values as a reference.

Adder 26 adds the first steering reactive force term after multiplying by the gain coefficient and the second steering reactive force term after multiplying by the gain coefficient to compute the final steering reactive force value.

Based on the computed final steering reactive force, steering reactive force motor 5 is actuated and controlled by controller 4 to apply a steering reactive force to the steering wheel 7. Consequently, the function in computing the steering reactive force of controller 4 and steering reactive force motor 5 is called the steering reactive force generating part.

Figure 3:
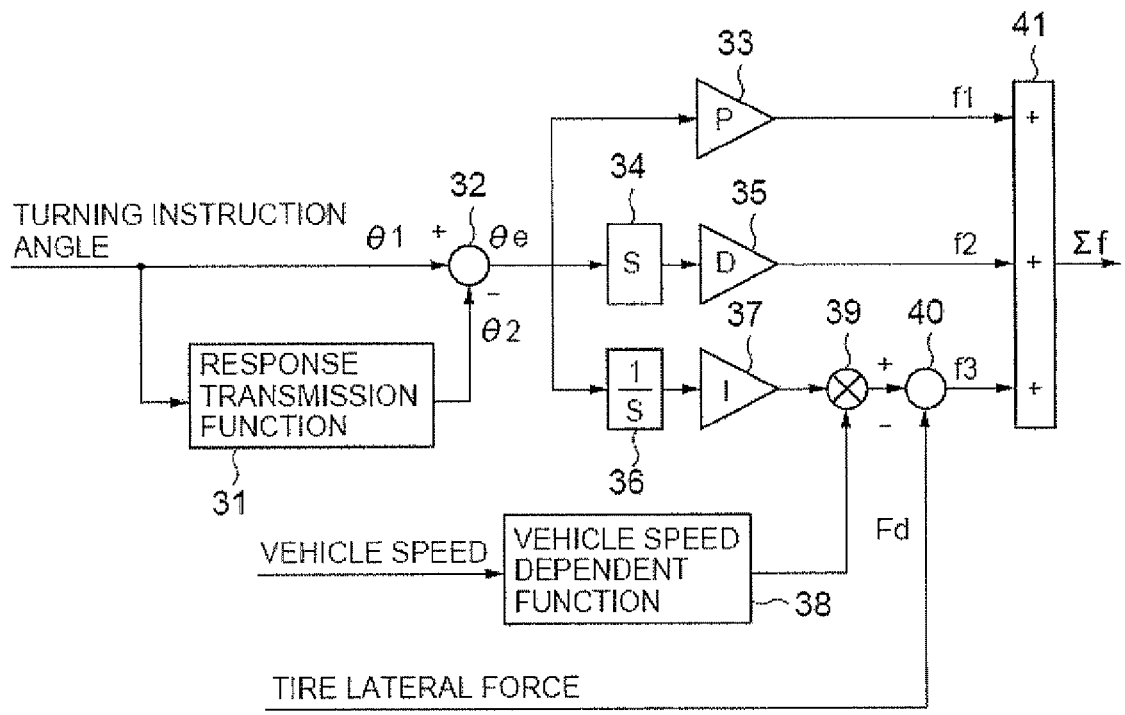
FIG. 3 is a block diagram showing computation of the steering system friction value according to a first embodiment.

In FIG. 3, which shows a block diagram illustrating the computing operation of steering system friction-estimating part 22 according to a first embodiment, a response transmission function block 31 multiplies a turning instruction angle $\theta 1$ (target turning angle) by a response transmission function corresponding to the expected response of the turning mechanism 3 to the turning instruction angle $\theta 1$. Response transmission function block 31 then outputs the result as turning response angle $\theta 2$. Turning response angle $\theta 2$ is an estimate of the real turning angle of tires 2a, 2b.

Comparison block 32 outputs a difference $\theta_e$ between the turning instruction angle $\theta_1$ and the turning response angle $\theta_2$.

Gain block 33 outputs the product $\theta_e \times P$ obtained by multiplying the proportional gain coefficient P and the difference $\theta_e$ as a friction value f1 as shown below.

$$f1 = \theta_e \times P \quad (1)$$

Differential block 34 outputs a differential value $d(\theta_e)/dt$ of the difference $\theta_e$.

Gain block 35 outputs the product $d(\theta_e)/dt \times D$ obtained by multiplying the differential gain coefficient D and the differential value $d(\theta_e)/dt$ as a friction value f2 as shown below.

$$f2 = d(\theta_e)/dt \times D \quad (2)$$

Integration block 36 outputs an integration value $\int \theta_e dt$ of the difference $\theta_e$.

Gain block 37 outputs the value obtained by multiplying the integration gain coefficient I with the integration value $\int \theta_e dt$.

Vehicle speed dependence function block 38 outputs a vehicle speed dependent function $V^2/(1+AV^2)$ corresponding to the vehicle speed. Here, V represents the vehicle speed, and A is a gain coefficient intrinsic to the vehicle.

Multiplying block 39 outputs a value $\int \theta_e dt \times I \times V^2/(1+AV^2)$ obtained by multiplying the vehicle speed dependence function $V^2/(1+AV^2)$ with the value obtained by multiplying the integration gain coefficient I with the integration value $\int \theta_e dt$, that is, $\int \theta_e dt \times I$, in the gain block 37.

Comparison block 40 outputs a friction value f3, which is obtained by subtracting tire lateral force Fd obtained using the axial force sensors 19a, 19b from the output of multiplying block 39, that is, $\int \theta_e dt \times I \times V^2/(1+AV^2)$ as shown below.

$$f3 = (\int \theta_e dt \times I \times V^2/(1+AV^2)) - Fd \quad (3)$$

Adder block 41 adds the friction values f1, f2, f3 and outputs the result as a steering system friction value $\Sigma f$.

Here, f1, f2 do not contain a steady-state component; instead, each contains only a transient component. Consequently, f1 and f2 are collectively called the transient friction component. On the other hand, f3 includes a steady-state component, so it is called the steady-state friction component.

Here, the transient friction component and the steady-state friction component are added to get the total friction value that corresponds to the overall friction quantity of the steering system. In this way, the overall friction (resistance force) of the steering system including the vehicle suspension and rack shaft 11 and pinion 17 can be estimated based on the transient component and steady-state component of the friction corresponding to the turning angle.

In operation, the vehicle steering controller of the first embodiment detects the tire lateral force input from tires 2a, 2b by means of the axial force sensors 19a, 19b, and computes the first steering reactive force term based on the tire lateral force (road surface reactive force) as well as the vehicle speed. As shown in FIG. 4, as the tire lateral force increases and the vehicle speed rises, the first steering reactive force term increases. Consequently, the road surface reactive force is transferred directly to the driver. Since the steering reactive force in high-speed running is higher than that in low-speed running, the driver can feel more secure.

The second steering reactive force term is computed corresponding to the overall friction (resistance force) of the steering system including the vehicle suspension and rack shaft 11 and pinion 17, and the vehicle speed. As shown in FIG. 4, just like the first steering reactive force term, as the road surface reactive force rises and the vehicle speed increases, the second reactive force term increases. Consequently, just as in the case of a conventional steering system, the steering system friction is transferred directly to the driver. Since the steering reactive force in high speed running is larger than that in low-speed running, the driver can feel more secure.

Here, since the final steering reactive force value is computed by multiplying the gain coefficient computed corresponding to the vehicle speed and the steering angle with the first steering reactive force term and the second steering reactive force term, respectively, and then adding them, it is possible to freely set the proportions of the first steering reactive force term and the second steering reactive force term corresponding to the vehicle speed and the steering angle. That is, it is possible to freely set the ratio of the recovery force of the steering reactive force and the ratio of the steering reactive force to the vehicle speed and the steering angle, and it is possible to realize a good steering sensation in agreement with the running state. For example, by increasing the proportion of the second steering reactive force term at high speed compared to that at low speed, it is possible to adjust the ratio of the steering sensation with respect to the steering holding force to an appropriate value. As a result, a desired steering reactive force sensation can be realized.

From the foregoing, it can be appreciated that the vehicle steering controller according to the first embodiment works with steering wheel 7 mechanically separated from turning mechanism 3 that turns tires 2a, 2b, steering reactive force motor 5 that applies a steering reactive force on steering wheel 7, axial force sensors 19a, 19b that detect the tire lateral force, and includes steering system friction-estimating part 22 that estimates the friction of the steering system ranging from the detecting position of axial force sensors 19a, 19b to steering wheel 7 and adder 26 that computes the steering reactive force applied on steering wheel 7 based on the first steering reactive force term corresponding to the tire lateral force and the second steering reactive force term corresponding to the steering system friction. Consequently, it is possible to reflect both the tire lateral force and the steering system friction in the steering reactive force, and a good steering sensation can be realized.

Since steering system friction-estimating part 22 estimates the steering system friction based on the turning angle (target turning angle) of tires 2a, 2b, it is possible to estimate the steering system friction from the turning angle more correctly and easily by means of this model of the steering system.

Additionally, since steering system friction-estimating part 22 estimates the steering system friction based on a steady-state component and transient component of tires 2a, 2b, it is possible to estimate the steering system friction more accurately.

Finally, since the vehicle steering controller computes the steering reactive force based on the tire lateral force (detected by axial force sensors 19a, 19b) and the steering system friction, the vehicle steering controller avoids measurement of the torque of the pinion shaft 14 (such as shown in Japanese Kokai Patent Publication No. 2003-137124), which can result in phase delay with respect to the tire lateral force. As a result, the phase delay generated in the steering reactive force to road surface reactive force decreases, and a good steering sensation can be obtained.

In a vehicle steering controller according to a second embodiment of the invention, just as in the first embodiment, a first steering reactive force term and a second steering reactive force term are computed, and a final steering reactive force value is determined. However, the second embodiment differs from the first embodiment with respect to the signal input to steering system friction-estimating part 22.

Figure 5:
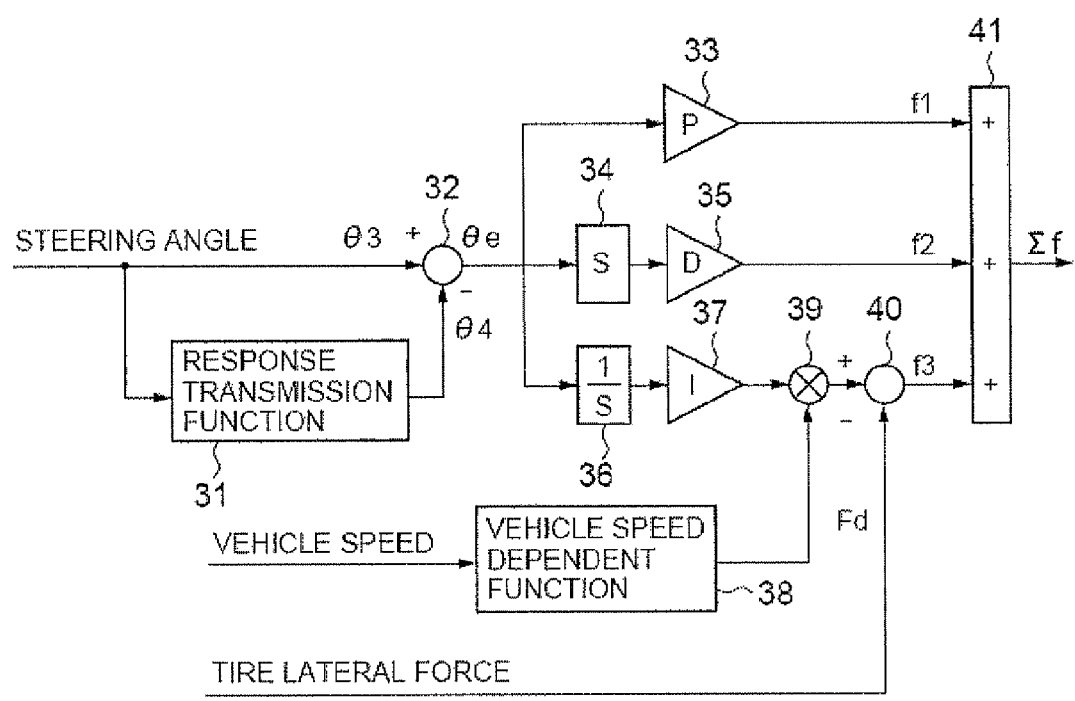
FIG. 5 is a block diagram showing computation of the steering system friction value according to a second embodiment.

As shown in FIG. 5, in the second embodiment the turning angle is input to the steering system friction-estimating part 22 instead of the turning instruction angle as was done in the first embodiment. Thus, in response transmission function block 31, the steering angle θ3 is multiplied by a response transmission function that corresponds to the expected response of the turning mechanism 3 to the steering angle θ3, and the result is output as a turning response angle θ4. Once the turning response angle θ4 is computed, comparison block 32 outputs the difference between θ3 and θ4 as $θ_e$.

From the foregoing, it can be appreciated that in the vehicle steering controller according to the second embodiment, since steering system friction-estimating part 22 estimates the steering system friction based on the steering angle of steering wheel 7, it is possible to estimate the steering system friction from the steering angle accurately while reducing the complexity of the system.

In a vehicle steering controller according to a third embodiment of the invention, just as in the first embodiment, the first steering reactive force term and the second steering reactive force term are computed to determine the final steering reactive force value. However, the third embodiment differs from the first embodiment in regard to the signal input to steering system friction-estimating part 22.

Figure 6:
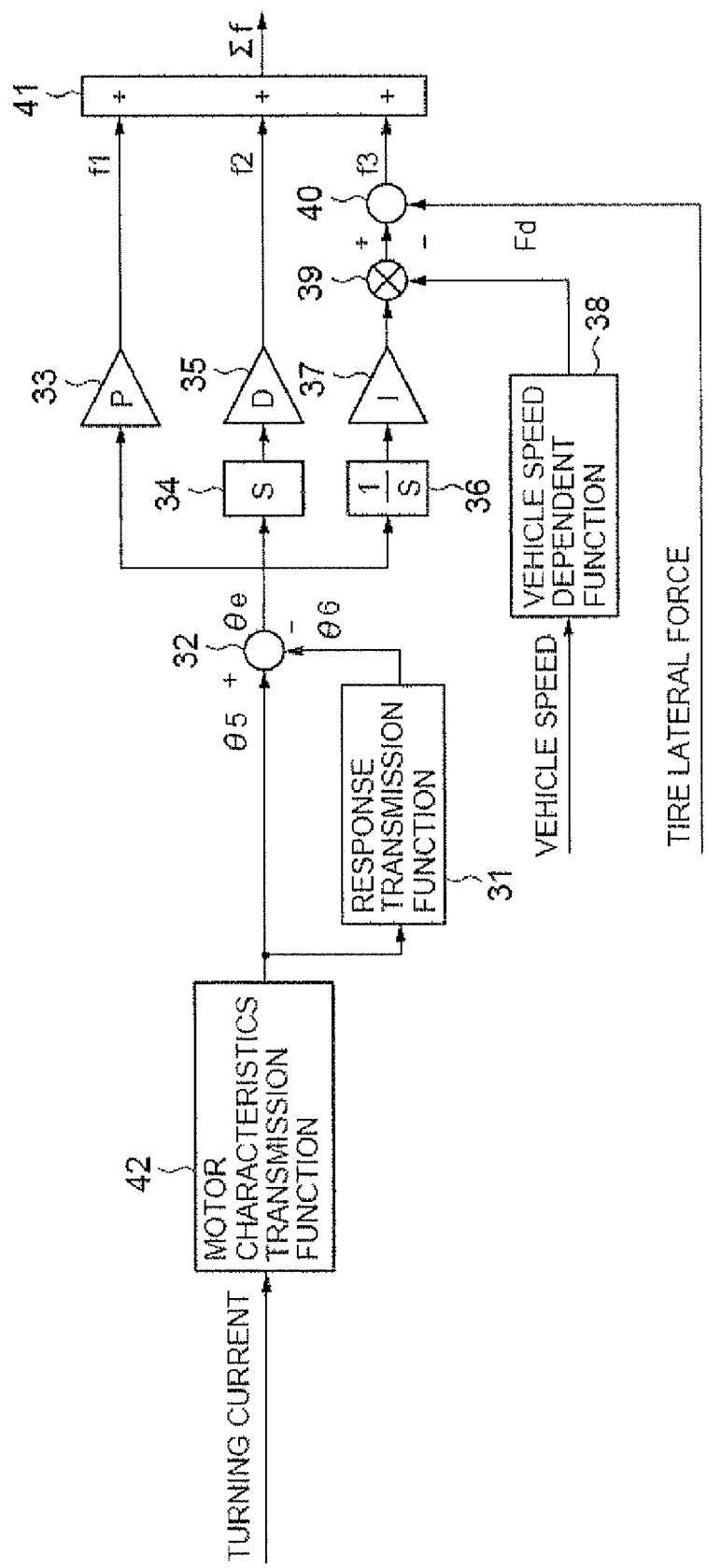
FIG. 6 is a block diagram showing computation of the steering system friction value according to a third embodiment.

As shown in FIG. 6, in the third embodiment the real currents (turning currents) of turning motors 9a, 9b are input to the steering system friction-estimating part 22 instead of the turning instruction angle as was done in the first embodiment. If either one of turning motors 9a, 9b is selectively activated, the real current of the turning motor becomes the turning current, and, when both turning motors 9a, 9b are driven, the sum of the two real currents becomes the turning current. The turning current is input to a motor characteristics transfer function block 42 that multiplies the turning current by a transfer function based on the characteristics of the turning motors 9a, 9b to obtain a turning angle θ5. Then, in response transmission function block 31, the turning angle θ5 is multiplied by a response transmission function that corresponds to the expected response of turning mechanism 3 to the turning angle θ5, and the result is output as a turning response angle θ6. Once the turning response angle θ6 is computed, comparison block 32 outputs the difference between θ5 and θ6 as $θ_e$.

From the foregoing it can be appreciated that, in the vehicle steering controller according to the third embodiment, it is possible to estimate the steering system accurately while reducing the complexity of the system since the steering system friction-estimating part 22 estimates the steering system friction based on the real current values of turning motors 9a, 9b that drive turning mechanism 3 using a model of the steering system.

In a vehicle steering controller according to a fourth embodiment of the invention, just as in the first embodiment, the first steering reactive force term and the second steering reactive force term are computed to determine a final steering reactive force value. However, the fourth embodiment differs from the first embodiment in regard to the signal input to steering system friction-estimating part 22.

Figure 7:
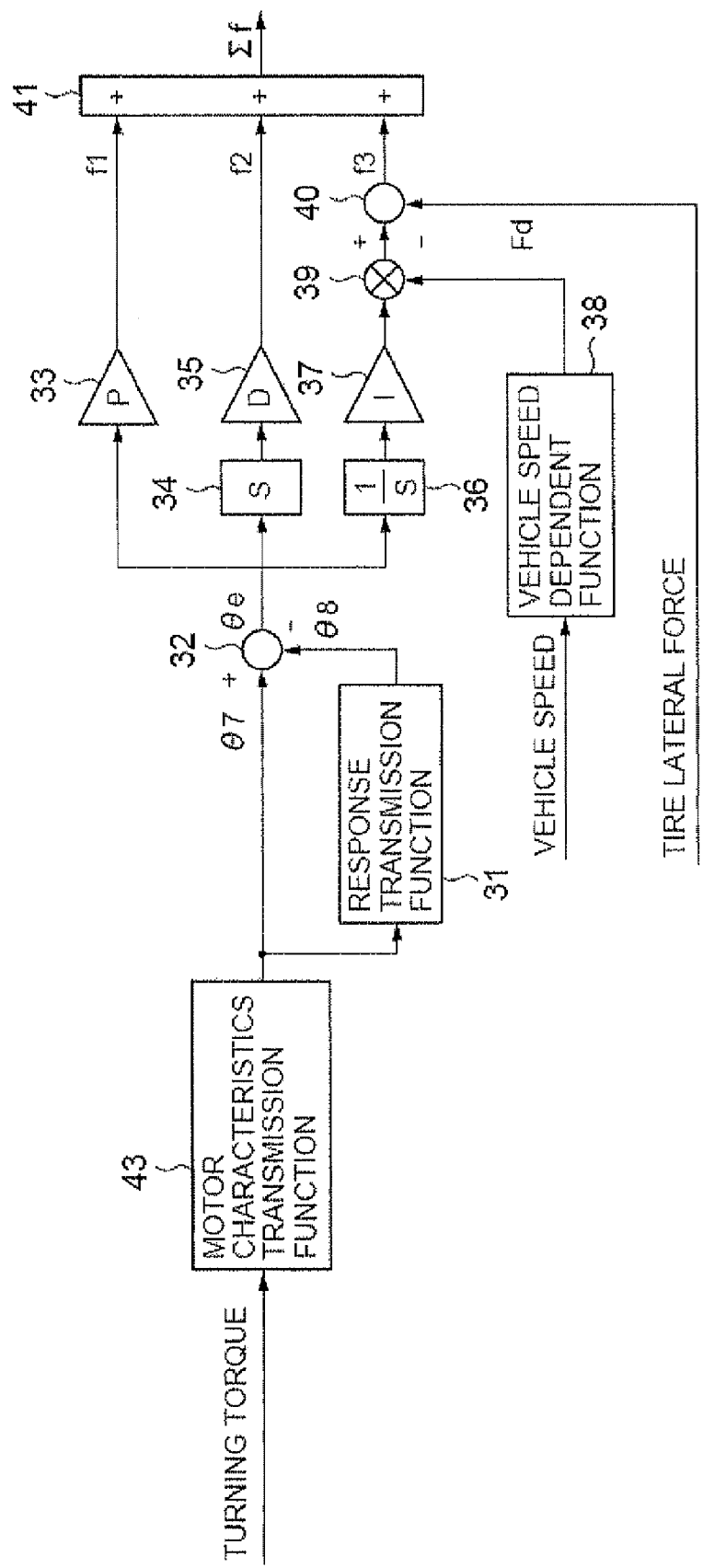
FIG. 7 is a block diagram showing computation of the steering system friction value according to a fourth embodiment.

As shown in FIG. 7, the signal input to steering system friction-estimating part 22 in the fourth embodiment is the turning reactive force (turning torque) acting on the pinion shaft 14 as detected by the turning torque sensor 18, instead of the turning instruction angle as was done in the first embodiment. The turning reactive force is input to a motor characteristics transfer function block 42 that multiplies the turning currents by a transfer function based on the characteristics of the turning motor characteristics and characteristics of the rack and pinion to obtain a turning angle θ7. Then, in response transmission function block 31, the turning angle θ7 is multiplied by a response transmission function that corresponds to the expected response of turning mechanism 3 to the turning angle θ7, and the result is output as a turning response angle θ8. Once the turning response angle θ8 is computed, comparison block 32 outputs the difference between θ7 and θ8 as $θ_e$.

From the foregoing, it can be appreciated that in the vehicle steering controller according to the fourth embodiment, since the steering system friction-estimating part 22 estimates the steering system friction based on the turning reactive force, it is possible to estimate the steering system friction accurately, while reducing the complexity of the system through the use of such a model of the steering system.

Figure 9:
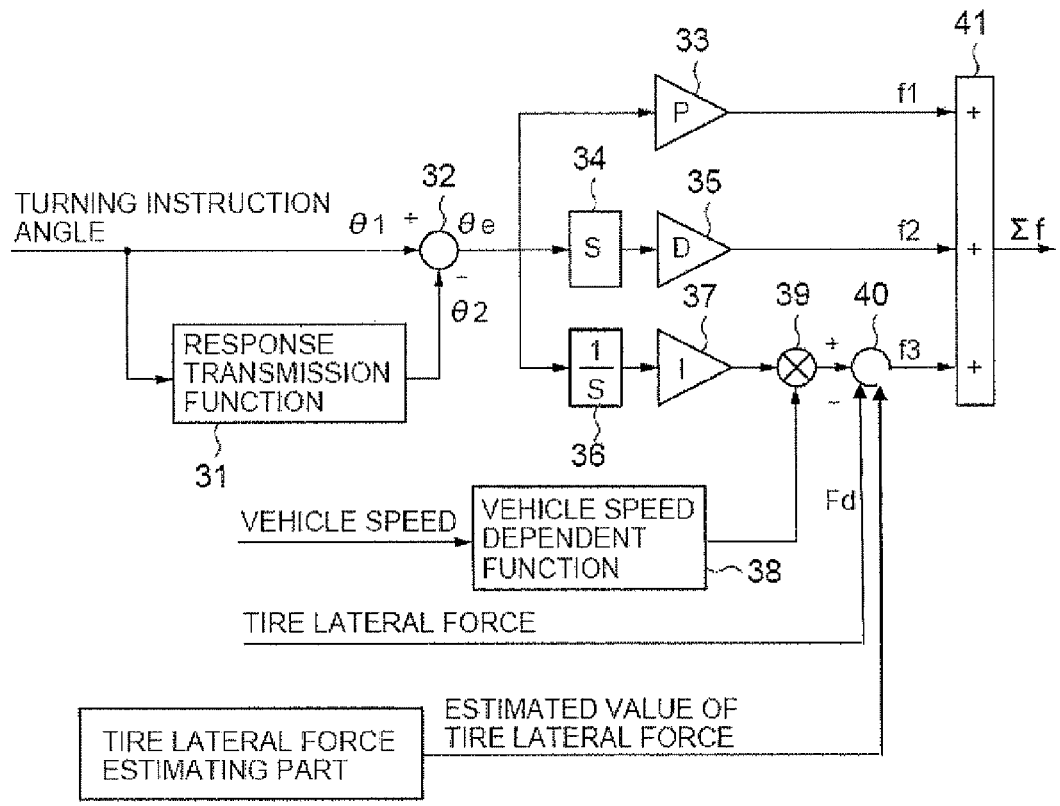
FIG. 9 is a block diagram showing computation of the steering system friction value according to fifth and sixth embodiments.

In a vehicle steering controller according to a fifth embodiment of the invention, the tire lateral force is estimated based on the vehicle behavior state. As shown in FIG. 9, in the steering system friction-estimating part according to the fifth embodiment, the tire lateral force and the estimated value of the tire lateral force are input to a comparator 40.

The fifth embodiment is particularly applicable to situations where the tire lateral force cannot be detected, for example, at certain speed ranges or at certain turning angles. For example, when axial force sensors 19a, 19b are tire load sensors arranged in the tire hub portions and when the vehicle speed is extremely low at 15 km/h or lower, axial force sensors 19a, 19b may not be able to detect the tire lateral force. Also, if axial force sensors 19a, 19b have a general hysteresis characteristic, the tire lateral force may not be detectable within the hysteresis range, such as the start of separation from the neutral state or the like. Thus, in the controller 4 according to the fifth embodiment, the tire lateral force is estimated based on the vehicle behavior state when the vehicle is operating under conditions where the tire lateral force cannot be detected.

The tire lateral force Fd may be estimated as shown below:

$$Fd = \{G1/(i+T_1 s)\} \times \{(V^2 \times θ2)/l(1+AV^2)\}; \text{ wherein} \quad (4)$$

G1, $T_1$ and l are vehicle intrinsic gain coefficients that are predetermined based on the specific vehicle. As a result, Fd can be computed as a function of the vehicle speed and turning response angle θ1.

Additionally, the tire lateral force Fd can be estimated as shown in either of the following formulas:

$$Fd = G2 \times γ; \text{ or} \quad (5)$$

$$Fd = G3 \times a_y; \text{ wherein} \quad (6)$$

γ represents the yaw rate (yaw angular velocity) of the center of gravity of the vehicle;
G2 is a function dependent on the vehicle speed;
$a_y$ represents the lateral acceleration of the center of gravity of the vehicle; and
G3 is a function dependent on the vehicle intrinsic gain coefficient.

Figure 8:
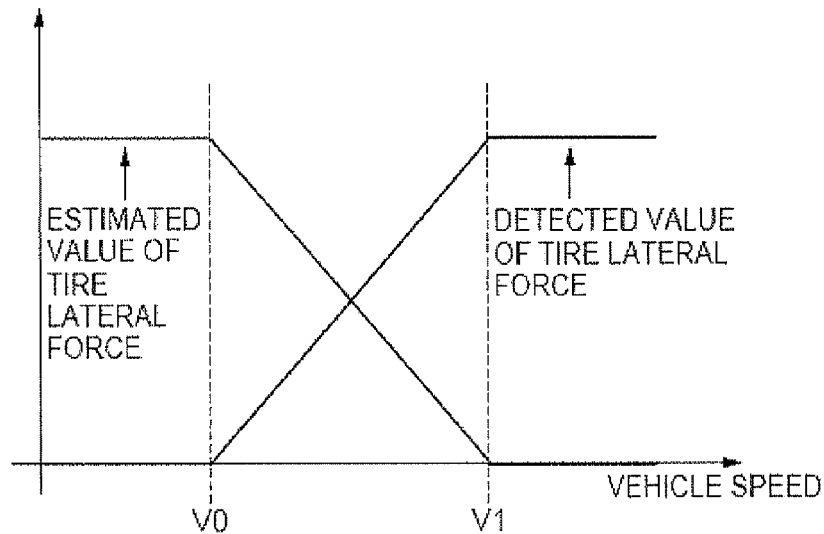
FIG. 8 is a range dependence map of the tire lateral force.

FIG. 8 is a diagram illustrating the vehicle speed dependence of the tire lateral force. In the first embodiment in the vehicle speed range and the turning angle range where a tire lateral force cannot be detected, the tire lateral force is estimated based on this map. Also, as shown in FIG. 8, when the vehicle speed becomes higher than certain value V0, the estimated tire lateral force decreases, and the tire lateral force detected by axial force sensors 19a, 19b rises.

As a result, even in an extremely low vehicle speed range (range of vehicle speed of V0 or lower) where a tire lateral force cannot be detected, it is possible to compute a first steering reactive force term corresponding to the tire lateral force by computing a first steering reactive force term based on the estimated value of the tire lateral force estimated by the tire lateral force estimating part. Consequently, it is possible to apply a steering reactive force corresponding to the tire lateral force with high reliability regardless of the vehicle speed and hysteresis.

Also, because the tire lateral force is computed based on the map shown in FIG. 8, when a change occurs from a range where a tire lateral force cannot be detected to a range where the tire lateral force can be detected, the driver can experience smooth transfer of the steering reactive force that corresponds to the tire lateral force.

From the foregoing, it can be appreciated that in the vehicle steering controller according to the fifth embodiment, tire lateral force estimating part is able to estimate the road surface reactive force corresponding to the tire lateral force based on the vehicle behavior state (vehicle speed V, yaw rate $\gamma$ or lateral acceleration $a_y$), and, in the range where a tire lateral force cannot be detected, adder 26 computes the steering reactive force based on a first steering reactive force term corresponding to the estimated road surface reactive force and a second steering reactive force term corresponding to the steering system friction. As a result, even in an extremely low speed range where a tire lateral force cannot be detected, and in a hysteresis range, both the tire lateral force and the steering system friction can be reflected in the steering reactive force, and it is possible to obtain a good steering sensation.

In a vehicle steering controller according to a sixth embodiment of the invention, the tire lateral force is estimated based on the real current of the turning motor in a range where a tire lateral force cannot be detected. In the sixth embodiment, the steer-by-wire system and the steering reactive force computation are the same as described in the first embodiment and as shown in FIGS. 1 and 2, while the steering system friction-estimating part is the same as described in the fifth embodiment and as shown in FIG. 9.

In the sixth embodiment, the tire lateral force estimating part estimates the tire lateral force Fd based on the real current value of turning motors 9a, 9b by means of the formula:

$$Fd = G4 \times A_m; \text{ wherein} \quad (7)$$

G4 represents a motor current gain coefficient; and
$A_m$ represents the real current value of turning motors 9a, 9b.

As a result, just as in the fifth embodiment, even in an extremely low vehicle speed range (a vehicle speed of V0 or lower in FIG. 8) and a turning angle range where the tire lateral force cannot be detected, it is possible to compute the first steering reactive force term corresponding to the tire lateral force. Consequently, it is possible to generate the steering reactive force corresponding to the tire lateral force with high reliability regardless of the vehicle speed. Also, because the tire lateral force is computed based on the map shown in FIG. 8, when a change occurs from a range where a tire lateral force cannot be detected to a range where the tire lateral force can be detected, the driver can experience smooth transfer of the steering reactive force corresponding to the tire lateral force.

From the foregoing, it can be appreciated that in the vehicle steering controller according to the sixth embodiment, the tire lateral force estimating part estimates the road surface reactive force corresponding to the tire lateral force based on the real current of turning motors 9a, 9b that drive turning mechanism 3. In a range where a tire lateral force cannot be detected, adder 26 computes the steering reactive force based on the first steering reactive force term corresponding to the estimated road surface reactive force and the second steering reactive force term corresponding to the steering system friction. As a result, even in an extremely low speed range and a turning angle range where the tire lateral force cannot be detected, both the tire lateral force and the steering system friction can be reflected in the steering reactive force, and it is possible to obtain a good steering sensation.

Although specific embodiments of the invention have been explained herein in the first through sixth embodiments, it should be understood that the invention is not limited to these particular embodiments. Rather, numerous design variations are within the scope of the invention.

For example, the turning angle of tires 2a, 2b is used in estimating the steering system friction in the first embodiment, the steering angle of steering wheel 7 is used in estimating the steering system friction in the second embodiment, the real current of steering reactive force motor 5 is used in estimating the steering system friction in the third embodiment, and the turning reactive force acting on pinion shaft 14 of rack shaft 11 and pinion 17 is used in estimating the steering system friction in the fourth embodiment. However, it should be understood that the aforementioned parameters could be combined in various combinations to estimate the steering system friction. For example, the constitution may be such that the various estimated values are averaged to compute the steering system friction.

Also, the turning angle is detected with turning angle sensor 15 in the foregoing embodiments. However, it should be understood that turning angle detection may be performed based on the rotation angles of the turning motors 9a or 9b, wherein the rotation angles of the turning motors are detected using respective encoders 21b, 21c. Furthermore, although the steering angle is detected by steering angle sensor 8 in the foregoing embodiments, it should be understood that detection of the steering angle may be performed based on the rotation angle of steering reactive force motor 5 as detected by the encoder 21a.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A vehicle steering controller for a vehicle including a steering wheel to be manipulated by a driver and a turning mechanism mechanically separated from the steering wheel and including a rack shaft responsive to rotation of a pinion coupled to a pinion shaft, the turning mechanism operable to perform steering driving of at least one steered wheel corresponding to a steering angle of the steering wheel, the controller comprising:

a tire lateral force detecting part configured to detect a tire lateral force acting on the at least one steered wheel and to output a tire lateral force value corresponding thereto;

a friction-estimating part configured to estimate a steering system friction value, the steering system friction value including a resistance force of at least the rack shaft and the pinion; and a steering reactive force generating part configured to generate a steering reactive force for application to the steering wheel, the steering reactive force generating part including a first force generating part configured to generate a first steering reactive force component based on the tire lateral force value, a second force generating part configured to generate a second steering reactive force component based on the steering system friction value and a gain computing part configured to compute a gain value for each of the first steering reactive force component and the second steering reactive force component; and wherein the magnitude of the steering reactive force is a sum of the first steering reactive force component and the second steering reactive force component as adjusted by respective gain values.

2. The vehicle steering controller according to claim 1 wherein the friction-estimating part is configured to estimate the steering system friction value based on a steering angle of the at least one steered wheel.

3. The vehicle steering controller according to claim 1 wherein the friction-estimating part is configured to estimate a steady-state steering system friction component and a transient steering system friction component and to add the steady-state steering system friction component and the transient steering system friction component to estimate the steering system friction value.

4. The vehicle steering controller according to claim 1 wherein the turning mechanism includes at least one turning motor operable to turn the at least one steered wheel and a current-detecting part operable to detect a real current value corresponding to the real current flowing in the at least one turning motor, the controller further comprising:
the friction-estimating part configured to estimate the steering system friction value based on the real current value.

5. The vehicle steering controller according to claim 1, further comprising:
a steering angle detecting part configured to detect a steering angle of the steering wheel; and wherein
the friction-estimating part is configured to estimate the steering system friction value based on the steering angle.

6. The vehicle steering controller according to claim 1 wherein the controller further comprises:
a turning reactive force detecting part configured to detect a turning reactive force value as a reactive force acting on the pinion shaft; and wherein
the friction-estimating part is configured to estimate the steering system friction value based on the turning reactive force value.

7. The vehicle steering controller according to claim 1, further comprising:
a vehicle behavior state detecting part configured to detect a vehicle behavior state value; and
a tire lateral force estimating part configured to output an estimated tire lateral force value based on the vehicle behavior state value; and wherein
the steering reactive force generating part is configured to generate a steering reactive force based on the estimated tire lateral force value and the steering system friction value under conditions where the lateral force detecting part is unable to detect the tire lateral force.

8. The vehicle steering controller according to claim 1 wherein the turning mechanism includes a turning motor operable to turn the at least one steered wheel and a current-detecting part configured to detect a real current flowing in the turning motor, the controller further comprising:
a tire lateral force estimating part configured to output an estimated tire lateral force value based on the real current flowing in the turning motor; and wherein
the steering reactive force generating part is configured to generate a steering reactive force based on the estimated tire lateral force value and the steering system friction value under conditions where the lateral force detecting part is unable to detect the tire lateral force.

9. A vehicle steering controller for a vehicle including a steering wheel to be manipulated by a driver and a turning mechanism mechanically separated from the steering wheel and operable to perform steering driving of at least one steered wheel corresponding to a steering angle of the steering wheel, the controller comprising:
means for detecting a tire lateral force acting on the at least one steered wheel and outputting a tire lateral force value corresponding thereto;
means for estimating a steering system friction value; and
means for generating a total steering reactive force for application to the steering wheel, the steering reactive force generation means including first force generation means for generating a first steering reactive force based on the tire lateral force value, second force generation means for generating a second steering reactive force based on the steering system friction value, gain computing means for computing a respective gain value for each of the first steering reactive force and the second steering reactive force, means for adjusting each of the first steering reactive force and the second steering reactive force by the respective gain value and means for summing the adjusted first steering reactive force and the adjusted second steering reactive force to obtain the total steering reactive force.

10. A method for steering a vehicle including a steering wheel to be manipulated by a driver and a turning mechanism mechanically separated from the steering wheel and operable to perform steering driving of at least one steered wheel corresponding to a steering angle of the steering wheel, the method comprising:
detecting a tire lateral force acting on the at least one steered wheel and outputting a tire lateral force value corresponding thereto;
estimating a steering system friction value;
calculating a first steering reactive force component based on the tire lateral force value;
calculating a second steering reactive force component based on the steering system friction value;
adjusting the first steering reactive force component by a first gain value;
adjusting the second steering reactive force component by a second gain value; and
generating a steering reactive force for application to the steering wheel by summing the adjusted first steering reactive force component and the adjusted second steering reactive force component.

11. The method according to claim 10 wherein estimating the steering system friction value further comprises estimating the steering system friction value based on a steering angle of the at least one steered wheel.

12. The method according to claim 11 wherein estimating the steering system friction value further comprises:
estimating a steady-state steering system friction component and a transient steering system friction component; and
adding the steady-state steering system friction component and the transient steering system friction component to obtain the steering system friction value.

13. The method according to claim 10 wherein estimating the steering system friction value further comprises:

estimating a steady-state steering system friction component and a transient steering system friction component based on a steering angle of the at least one steered wheel; and adding the steady-state steering system friction component and the transient steering system friction component to obtain the steering system friction value.

14. The method according to claim 10 wherein the turning mechanism includes at least one turning motor operable to turn the at least one steered wheel and a current-detecting part operable to detect a real current value corresponding to the real current flowing in the at least one turning motor, the method further comprising:

receiving the real current value; and wherein estimating the steering system friction value further comprises estimating the steering system friction value based on the real current value.

15. The method according to claim 10, further comprising:
detecting a steering angle of the steering wheel; and wherein estimating the steering system friction value further comprises estimating the steering system friction value based on the steering angle.

16. The method according to claim 10 wherein the turning mechanism includes a pinion shaft and a rack shaft, wherein rotation of the pinion shaft displaces the rack shaft and displacement of the rack shaft turns the at least one steered wheel, the method further comprising:

detecting a turning reactive force value as a reactive force acting on the pinion shaft; and wherein estimating the steering system friction value further comprises estimating the steering system friction value based on the turning reactive force value.

17. The method according to claim 10, further comprising:
detecting a vehicle behavior state value; and
estimating an estimated tire lateral force value based on the vehicle behavior state value; and wherein generating the steering reactive force further comprises generating a steering reactive force based on the estimated tire lateral force value and the steering system friction value under conditions where detecting the tire lateral force produces an incorrect tire lateral force.

18. The method according to claim 10 wherein the turning mechanism includes a turning motor operable to turn the at least one steered wheel and a current-detecting part configured to detect a real current flowing in the turning motor, the method further comprising:

estimating an estimated tire lateral force value based on the real current flowing in the turning motor; and wherein generating the steering reactive force further comprises generating a steering reactive force based on the estimated tire lateral force value and the steering system friction value under conditions where detecting the tire lateral force produces an incorrect tire lateral force.

* * * * *